United States Patent
Takahashi et al.

(10) Patent No.: US 8,405,958 B2
(45) Date of Patent: Mar. 26, 2013

(54) CONDUCTIVE POLYMER SUSPENSION AND METHOD FOR PRODUCING THE SAME, CONDUCTIVE POLYMER MATERIAL, AND SOLID ELECTROLYTIC CAPACITOR AND METHOD FOR PRODUCING THE SAME

(75) Inventors: Naoki Takahashi, Miyagi (JP); Tomoki Nobuta, Miyagi (JP); Yasuhisa Sugawara, Miyagi (JP); Yuji Yoshida, Miyagi (JP); Satoshi Suzuki, Miyagi (JP); Yasuhiro Tomioka, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 257 days.

(21) Appl. No.: 13/013,361

(22) Filed: Jan. 25, 2011

(65) Prior Publication Data

US 2011/0182002 A1    Jul. 28, 2011

(30) Foreign Application Priority Data

Jan. 27, 2010    (JP) .................................. 2010-015700

(51) Int. Cl.
*H01G 9/025*    (2006.01)
(52) U.S. Cl. ........ 361/525; 361/523; 361/524; 361/519; 361/528; 361/529
(58) Field of Classification Search .................. 361/525, 361/523, 524, 516–519, 528, 529, 508–509; 29/25.01, 25.03
See application file for complete search history.

(56) References Cited

U.S. PATENT DOCUMENTS

| | | | | |
|---|---|---|---|---|
| 7,351,359 | B2 * | 4/2008 | Maruyama et al. | 252/500 |
| 7,585,433 | B2 * | 9/2009 | Kamakura et al. | 252/500 |
| 8,279,582 | B2 * | 10/2012 | Nobuta et al. | 361/525 |
| 8,289,677 | B2 * | 10/2012 | Kobayakawa et al. | 361/525 |
| 2004/0232390 | A1 * | 11/2004 | Viswanathan | 252/500 |
| 2010/0091432 | A1 * | 4/2010 | Sugawara et al. | 361/525 |
| 2011/0122546 | A1 | 5/2011 | Nobuta et al. | |

FOREIGN PATENT DOCUMENTS

| | | |
|---|---|---|
| CN | 102082028 | 6/2011 |
| JP | 07-090060 | 4/1995 |
| JP | 2004-059666 | 2/2004 |
| JP | 2007-119631 | 5/2007 |
| JP | 2007-297500 | 11/2007 |

OTHER PUBLICATIONS

CN Office Action dated May 4, 2012, with English translation, Application No. 201110029390.1.

* cited by examiner

*Primary Examiner* — Nguyen T Ha
(74) *Attorney, Agent, or Firm* — Young & Thompson (57) ABSTRACT

The present invention provides a conductive polymer suspension for providing a conductive polymer material having high conductivity and a method for producing the same, and particularly provides a solid electrolytic capacitor having low ESR and a method for producing the same. In an emulsion comprising a dopant of a low molecular organic acid or a salt thereof, obtained by emulsifying a monomer providing a conductive polymer, using a nonionic surfactant, in a water, the monomer is subjected to chemical oxidative polymerization, using an oxidant, to synthesize a conductive polymer. The obtained conductive polymer is purified, and then, the purified conductive polymer and an oxidant are mixed in an aqueous solvent containing a polyacid component to produce a conductive polymer suspension.

20 Claims, 2 Drawing Sheets

CONDUCTIVE POLYMER SUSPENSION AND
METHOD FOR PRODUCING THE SAME,
CONDUCTIVE POLYMER MATERIAL, AND
SOLID ELECTROLYTIC CAPACITOR AND
METHOD FOR PRODUCING THE SAME

This application is based upon and claims the benefit of priority from Japanese patent application No. 2010-015700, filed on Jan. 27, 2010, the disclosure of which is incorporated herein in its entirety by reference.

BACKGROUND OF THE INVENTION

1. Field of the Invention

The present exemplary embodiment relates to a conductive polymer suspension and a method for producing the same, a conductive polymer material, and a solid electrolytic capacitor and a method for producing the same.

2. Description of the Related Art

Conductive organic materials are used for the electrodes of capacitors, the electrodes of dye-sensitized solar cells and the like, the electrodes of electroluminescent displays, and the like. Conductive polymers obtained by polymerizing pyrrole, thiophene, aniline, and the like are known as such conductive organic materials.

Such a conductive polymer is generally provided as a dispersion (suspension) or a solution in an aqueous solvent, or a solution in an organic solvent, and is used as a conductive polymer material by removing the solvent in use. But, even if the type of the conductive polymer is the same, the physical properties of the obtained conductive polymer material are different depending on the state of the dispersion, and therefore, various studies have been made on the method for producing the dispersion.

JP7-90060A discloses techniques regarding a solution (dispersion) of polythiophene and a method for producing the same, and its use in the antistatic treatment of a plastic molded article. This dispersion of polythiophene includes water or a mixture of a water-miscible organic solvent and water as a dispersion medium, polythiophene composed of the structural unit of 3,4-dialkoxythiophene, and a polyanion derived from polystyrenesulfonic acid having a molecular weight in the range of 2,000 to 500,000. The polythiophene is obtained by chemical oxidative polymerization in the presence of a polyanion of polystyrenesulfonic acid having a molecular weight in the range of 2,000 to 500,000. It is said that thus, a transparent antistatic film can be formed.

JP2004-59666A discloses techniques regarding a water dispersion of a composite of poly(3,4-dialkoxythiophene) and a polyanion and a method for producing the same, and a coating composition containing the water dispersion, and a coated substrate including a transparent conductive film formed by coating with the composition. This water dispersion is obtained by polymerizing 3,4-dialkoxythiophene in an aqueous solvent in the presence of a polyanion, using peroxodisulfuric acid as an oxidant. Alternatively, this water dispersion is obtained by subjecting 3,4-dialkoxythiophene to chemical oxidative polymerization in an aqueous solvent in the presence of a polyanion, using an oxidant, with the pH of the reaction solution decreased by adding an acid selected from the group consisting of water-soluble inorganic acids and organic acids. It is said that thus, a conductive thin film having excellent transparency can be formed.

JP2007-119631A discloses a method for producing conductive polymer fine particles dispersed in an organic solvent. According to this, it is said that conductive polymer fine particles dispersed in an organic solvent can be produced by performing electrolytic polymerization, with ultrasonic irradiation, in an emulsion obtained by mixing and stirring a monomer, an organic solvent, water, and a surfactant, and then removing the water layer.

JP2007-297500A discloses a technique regarding conductive polymer fine particles dispersed in water. According to this, it is said that conductive polymer fine particles stably dispersed in water are obtained by subjecting a monomer to chemical oxidative polymerization in water in the presence of a reactive emulsifier, and that the particle surface is coated with the reactive emulsifier or copolymerized with the reactive emulsifier.

However, in a method for subjecting 3,4-dialkoxythiophene to chemical oxidative polymerization in one stage, in the presence of a polyanion acting as a dopant, as in the methods described in JP7-90060A and JP2004-59666A, the control of the doping rate is difficult. In other words, undoped polyanions, that is, polyanions not contributing to conductivity, are present in an excess amount, and it is difficult to say that this method is sufficient as a production method for obtaining a conductive polymer material having higher conductivity.

In addition, a conductive polymer film obtained by the method described in JP7-90060A has sufficient conductivity as an antistatic material, but when it is used, for example, as the solid electrolyte of a capacitor, it is difficult to achieve conductivity that sufficiently satisfy requirements for lower ESR. In other words, the surface resistivity of an antistatic film is generally $10^5$ to $10^{14}\Omega/\square$, and too high conductivity may cause severe electrostatic discharge, and therefore, it is considered that the antistatic film does not have such conductivity that can quickly dissipate the static electricity of a charged object. Therefore, a material that can be used as an antistatic film has high resistance as the solid electrolyte of a capacitor and cannot meet requirements for low resistance. In addition, a capacitor including a solid electrolyte containing excess polyanions has a disadvantage that its reliability, particularly its properties in a higher humidity atmosphere, is poor.

The conductive polymer fine particles dispersed in the organic solvent, produced by the production method described in JP2007-119631A, contains the surfactant. Therefore, a conductive polymer film obtained by removing the organic solvent contains the surfactant, and a problem of the conductive polymer film is that it has high resistance.

In addition, in JP2007-119631A, the monomer is dissolved in the organic solvent or in the water, and further, the water layer is removed later, and therefore, the organic solvent and the water are substances that are not dissolved in or mixed with each other, and the surfactant is added for the purpose of emulsifying the organic solvent and the water. Therefore, JP2007-119631A discloses no technique regarding the production of a conductive polymer suspension containing no surfactant, in which a monomer is emulsified in water.

In the conductive polymer fine particles dispersed in water described in JP2007-297500A, the emulsifier is present on the particle surface. Therefore, a conductive polymer film obtained by removing the solvent contains the emulsifier at the particle interface, and a problem of the conductive polymer film is that it has high resistance.

In addition, in JP2007-297500A, the fine particles are stably dispersed in the water by containing the reactive emulsifier on the particle surface, and JP2007-297500A discloses no technique regarding the production of a conductive polymer suspension containing no surfactant.

It is an object of the present exemplary embodiment to solve the above problems and specifically to provide a conductive polymer suspension for providing a conductive polymer material having high conductivity and a method for producing the same, and particularly provide a solid electrolytic capacitor having low ESR and a method for producing the same.

SUMMARY OF THE INVENTION

A method for producing a conductive polymer suspension according to the present exemplary embodiment includes (a) a step of, in an emulsion comprising a dopant of a low molecular organic acid or a salt thereof, obtained by emulsifying a monomer (M1) providing a conductive polymer, using a nonionic surfactant (S1), in a water, subjecting the monomer (M1) to chemical oxidative polymerization, using an oxidant (O1) to synthesize a conductive polymer (P1); (b) a step of purifying the conductive polymer (P1); and (c) a step of mixing the purified conductive polymer (P1) and an oxidant (O2) in an aqueous solvent containing a polyacid component to obtain a conductive polymer suspension.

A conductive polymer suspension according to the present exemplary embodiment is obtained by the above method. A conductive polymer material according to the present exemplary embodiment is obtained by removing the solvent from the above conductive polymer suspension. A solid electrolytic capacitor according to the present exemplary embodiment includes a solid electrolyte layer containing the above conductive polymer material.

A first method for producing a solid electrolytic capacitor according to the present exemplary embodiment includes the steps of forming a dielectric layer on a surface of an anode conductor of a valve action metal; and coating or impregnating the dielectric layer with the above conductive polymer suspension and removing the solvent from the conductive polymer suspension to form a solid electrolyte layer containing a conductive polymer material.

A second method for producing a solid electrolytic capacitor according to the present exemplary embodiment includes the steps of forming a dielectric layer on a surface of an anode conductor of a valve action metal; subjecting a monomer (M2) providing a conductive polymer to chemical oxidative polymerization or electrolytic polymerization on the dielectric layer to form a first solid electrolyte layer containing a conductive polymer (P2); and coating or impregnating the first solid electrolyte layer with the above conductive polymer suspension and removing the solvent from the conductive polymer suspension to form a second solid electrolyte layer.

The present exemplary embodiment can provide a conductive polymer suspension for providing a conductive polymer material having high conductivity and a method for producing the same, and particularly provide a solid electrolytic capacitor having low ESR and a method for producing the same.

In the drawing, numerals have the following meanings. 1: anode conductor, 2: dielectric layer, 3: solid electrolyte layer, 3*a*: first solid electrolyte layer, 3*b*: second solid electrolyte layer, 4: cathode conductor, 4*a*: carbon layer, 4*b*: silver conductive resin layer.

DETAILED DESCRIPTION OF THE PREFERRED EMBODIMENT

A method for producing a conductive polymer suspension according to the present exemplary embodiment will be described.

First, in an emulsion comprising a dopant of a low molecular organic acid or a salt thereof, obtained by emulsifying a monomer (M1) providing a conductive polymer, using a nonionic surfactant (S1), in a water, the monomer (M1) is subjected to chemical oxidative polymerization, using an oxidant (O1), to synthesize a conductive polymer (P1) (step (a)). By performing this step (a), the conductive polymer (P1) having a high degree of polymerization and a high degree of crystallinity can be obtained.

The monomer (M1) can be appropriately selected from monomers providing conductive polymers. Specific examples of the monomer (M1) include pyrrole, thiophene, aniline, and derivatives thereof. Specific examples of the pyrrole derivatives include 3-alkylpyrroles, such as 3-hexylpyrrole, 3,4-dialkylpyrroles, such as 3,4-dihexylpyrrole, 3-alkoxypyrroles, such as 3-methoxypyrrole, and 3,4-dialkoxypyrroles, such as 3,4-dimethoxypyrrole. Specific examples of the thiophene derivatives include 3,4-ethylenedioxythiophene and derivatives thereof, 3-alkylthiophenes, such as 3-hexylthiophene, and 3-alkoxythiophenes, such as 3-methoxythiophene. Specific examples of the aniline derivatives include 2-alkylanilines, such as 2-methylaniline, and 2-alkoxyanilines, such as 2-methoxyaniline. Among them, 3,4-ethylenedioxythiophene represented by the following formula (1) or derivatives thereof are preferred. Examples of the 3,4-ethylenedioxythiophene derivatives include 3,4-(1-alkyl)ethylenedioxythiophenes, such as 3,4-(1-hexyl)ethylenedioxythiophene. One monomer (M1) can be used, or two or more monomers (M1) can be used in combination.

[Formula 1]

(1)

The concentration of the monomer (M1) in the emulsion is preferably 0.5 mol/L or less because a sufficiently emulsified state is obtained, and the particles contained in the produced conductive polymer dispersion can be made finer. In addition, the concentration of the monomer (M1) in the emulsion is preferably 0.01 mol/L or more because the conductive polymer (P1) is efficiently obtained. But, the lower limit is not particularly limited.

A low molecular organic acid or a salt thereof is used as the dopant. Specific examples of the low molecular organic acid or a salt thereof include alkylsulfonic acid, benzenesulfonic acid, naphthalenesulfonic acid, anthraquinonesulfonic acid, camphorsulfonic acid, and derivatives thereof, and iron(III) salts thereof. The low molecular organic acid may be monosulfonic acid, disulfonic acid, or trisulfonic acid. Specific examples of the alkylsulfonic acid derivatives include 2-acrylamide-2-methylpropanesulfonic acid. Specific examples of the benzenesulfonic acid derivatives include phenolsulfonic acid, styrenesulfonic acid, toluenesulfonic acid, and dodecylbenzenesulfonic acid. Specific examples of the naphthalenesulfonic acid derivatives include 1-naphthalenesulfonic acid, 2-naphthalenesulfonic acid, 1,3-naphthalenedisulfonic acid, 1,3,6-naphthalenetrisulfonic acid, and 6-ethyl-1-naphthalenesulfonic acid. Specific examples of the anthraquinonesulfonic acid derivatives include anthraquinone-1-sulfonic acid, anthraquinone-2-sulfonic acid, anthraquinone-2,6-disulfonic acid, and 2-methylanthraquinone-6-sulfonic acid. Among them, 1-naphthalenesulfonic acid, 2-naphthalenesulfonic acid, 1,3,6-naphthalenetrisulfonic acid, anthraquinonedisulfonic acid, p-toluenesulfonic acid, camphorsulfonic acid, or iron(III) salts thereof are preferred. Camphorsulfonic acid is further preferred because it has a large effect on higher crystallization of the polymer. The camphorsulfonic acid may be an optically active substance. In addition, iron(III) p-toluenesulfonate is also preferred because it also functions as the oxidant (O1). One dopant can be used, or two or more dopants can be used in combination.

The amount of the dopant used is not particularly limited because even if an excess amount of the dopant is added, it can be removed in step (b). But, the amount of the dopant used is preferably 1 to 100 parts by weight, more preferably 1 to 20 parts by weight, with respect to 1 part by weight of the monomer (M1), in order to obtain the conductive polymer (P1) having high conductivity.

The nonionic surfactant (S1) can be appropriately selected from those capable of emulsifying the monomer (M1). Specific examples of the nonionic surfactant (S1) include polyethylene glycol; polyethylene glycol alkyl ethers, such as polyethylene glycol monododecyl ether and polyethylene glycol monocetyl ether; polyethylene glycol fatty acid esters, such as polyethylene glycol monostearate; and acetylene glycol. The degree of polymerization of polyethylene glycol in polyethylene glycol, polyethylene glycol alkyl ethers, and polyethylene glycol fatty acid esters is not particularly limited. But, the HLB value obtained by the Griffin method is preferably 6 or more because a sufficiently emulsified state is obtained.

Here, if an ionic surfactant is used, it is taken in the conductive polymer (P1) as a dopant, and the effect of washing and removal in the step (b) is reduced due to electrostatic attraction. In addition, if an ionic surfactant remains in the conductive polymer (P1), the moisture absorption properties of the conductive polymer (P1) increase, and the moisture resistance properties of the solid electrolytic capacitor decrease.

The concentration of the nonionic surfactant (S1) in the emulsion is preferably 2 mmol/L or more because a sufficiently emulsified state is obtained, and the particles contained in the produced conductive polymer dispersion can be made finer.

The oxidant (O1) is not particularly limited, and iron(III) salts of inorganic acids, such as iron(III) chloride hexahydrate, anhydrous iron(III) chloride, iron(III) nitrate nonahydrate, anhydrous ferric nitrate, iron(III) sulfate n-hydrate (n=3 to 12), iron(III) ammonium sulfate dodecahydrate, iron (III) perchlorate n-hydrate (n=1, 6), and iron(III) tetrafluoroborate; copper(II) salts of inorganic acids, such as copper (II) chloride, copper(II) sulfate, and copper(II) tetrafluoroborate; nitrosonium tetrafluoroborate; persulfates, such as ammonium persulfate, sodium persulfate, and potassium persulfate; periodates, such as potassium periodate; hydrogen peroxide, ozone, potassium hexacyanoferrate(III), tetraammonium cerium(IV) sulfate dihydrate, bromine, and iodine; and iron(III) salts of organic acids, such as iron(III) p-toluenesulfonate, can be used. Among them, iron(III) salts of inorganic acids or organic acids, or persulfates are preferred, and ammonium persulfate or iron(III) p-toluenesulfonate is more preferred. Particularly, iron(III) p-toluenesulfonate is more preferred because it also serves as an organic acid dopant. One oxidant (O1) can be used, or two or more oxidants (O1) can be used in combination.

The amount of the oxidant (O1) used is not particularly limited because even if an excess amount of the oxidant (O1) is added, it can be removed in the step (b). But, the amount of the oxidant (O1) used is preferably 0.5 to 100 parts by weight, more preferably 1 to 40 parts by weight, with respect to 1 part by weight of the monomer (M1), in order to allow the reaction to occur in a milder oxidizing atmosphere to obtain the polymer having high conductivity.

The conductive polymer (P1) obtained by subjecting the monomer (M1) to chemical oxidative polymerization has a structural unit derived from the monomer (M1). For example, when 3,4-ethylenedioxythiophene represented by the formula (1) is used as the monomer (M1), the obtained conductive polymer (P1) has a structural unit represented by the following formula (2).

[Formula 2]

(2)

The chemical oxidative polymerization is preferably performed with stirring. The reaction temperature of the chemical oxidative polymerization is not particularly limited. But, the chemical oxidative polymerization is performed with the reflux temperature of the solvent used, as the upper limit, and the reaction temperature is preferably 0 to 100° C., more preferably 10 to 50° C. If the reaction temperature is not appropriate, the conductivity of the obtained conductive polymer (P1) may decrease. The reaction time of the chemical oxidative polymerization depends on the type and amount of the oxidant (O1), the reaction temperature, the stirring conditions, and the like, but is preferably about 5 to 100 hours. When the conductive polymer (P1) is produced, the reaction liquid changes to dark blue.

Then, the conductive polymer (P1) is purified (the step (b)). Specifically, the conductive polymer (P1) is separated from the reaction liquid containing the conductive polymer (P1) obtained by the chemical oxidative polymerization, and washed to remove the dopant, the monomer (M1), the nonionic surfactant (S1), the oxidant (O1), and an oxidant after the reaction. By performing this step (b), the conductive polymer (P1) having high purity can be obtained.

Examples of the method for separating the conductive polymer (P1) from the reaction liquid include a filtration method and a centrifugation method.

For the washing solvent, a solvent capable of dissolving at least one of the monomer (M1), the oxidant (O1), and the nonionic surfactant (S1), without dissolving the conductive polymer (P1), is preferably used. Specific examples of the washing solvent include water, and alcohol solvents, such as methanol, ethanol, and propanol. One washing solvent can be used, or two or more washing solvents can be used in combination. The extent of the washing can be checked by the pH measurement or colorimetric observation of the washing solvent after the washing.

Further, the conductive polymer (P1) is preferably subjected to hot water washing and/or heat treatment because the metal component derived from the oxidant (O1) can be removed to a higher degree. The temperature of the heat treatment is not particularly limited as long as it is equal to or less than the decomposition temperature of the conductive polymer (P1). But, the temperature of the heat treatment is preferably less than 300° C. In addition, ion exchange treatment using an ion exchange resin is also effective as the method for removing the metal component derived from the oxidant.

The impurities contained in the conductive polymer (P1) can be quantified by ICP emission analysis, ion chromatography, or the like.

Then, the purified conductive polymer (P1) and an oxidant (O2) are mixed in an aqueous solvent containing a polyacid component to obtain a conductive polymer suspension (step (c)). In the step (c), the polyacid acts as a dispersant, and therefore, the conductive polymer suspension having good dispersibility can be obtained. At least the doping action of the polyanions derived from the polyacid component is considered as the dispersion mechanism.

The aqueous solvent is preferably water and may be a mixed solvent of water and a water-soluble organic solvent. Specific examples of the water-soluble organic solvent include protic polar solvents, such as methanol, ethanol, propanol, and acetic acid; and aprotic polar solvents, such as N,N-dimethylformamide, dimethylsulfoxide, acetonitrile, and acetone.

The concentration of the conductive polymer (P1) in the aqueous solvent is preferably 0.1 to 20% by weight, more preferably 0.5 to 10% by weight.

A polyacid or a salt thereof can be used as the polyacid component. Specific examples of the polyacid include polycarboxylic acids, such as polyacrylic acid, polymethacrylic acid, and polymaleic acid; polysulfonic acids, such as polyvinylsulfonic acid, poly(2-acrylamide-2-methylpropanesulfonic acid), and polystyrenesulfonic acid; and copolymers having the structural units of these. Specific examples of the salt of the polyacid include the lithium salt, sodium salt, potassium salt, and ammonium salt of the polyacid. Among them, polystyrenesulfonic acid having a structural unit represented by the following formula (3) is preferred. One polyacid component can be used, or two or more polyacid components can be used in combination.

[Formula 3]

(3)

The weight average molecular weight of the polyacid component is preferably 2,000 to 500,000, more preferably 10,000 to 200,000, in order to obtain the conductive polymer (P1) having high conductivity.

The amount of the polyacid component used is preferably 20 to 3,000 parts by weight, more preferably 30 to 1,000 parts by weight, with respect to 100 parts by weight of the conductive polymer (P1), in order to obtain the conductive polymer (P1) having high conductivity.

As the oxidant (O2), those similar to the oxidant (O1) can be used. Among them, ammonium persulfate or hydrogen peroxide is preferred. The amount of the oxidant (O2) used is preferably 0.5 to 50 parts by weight, more preferably 1 to 30 parts by weight, with respect to 1 part by weight of the conductive polymer (P1), in order to obtain the conductive polymer (P1) having high conductivity.

The temperature of the step (c) is not particularly limited, but is preferably in the range of 0° C. to 100° C., more preferably 10° C. to 50° C. The time of the step (c) is not particularly limited, but is about 5 to 100 hours.

It is more preferred to perform the above-described ion exchange treatment after the step (c).

It is preferred to perform a step (d) of mixing at least one selected from erythritol and pentaerythritol during or after the step (c). By performing the step (d), erythritol or pentaerythritol interacts with the polyacid component (undoped dopant anions (a resistive component)) present near the conductive polymer (P1) in the conductive polymer suspension, and therefore, the resistance between the conductive polymer (P1) particles is lowered, and the density of the conductive polymer (P1) is increased. Therefore, higher conductivity can be achieved.

Erythritol has higher crystallinity than, for example, polyhydric alcohols, such as sorbitol and maltitol, and therefore, it has low moisture absorption properties, and its handling is easy. From this perspective, erythritol is preferred. In addition, erythritol is known as a food additive used as a sweetener, and is also excellent in a safety aspect and stability. In addition, erythritol also has several-fold higher water solubility than, for example, nonaqueous solvents, such as ethylene glycol and glycerin, and erythritol has an advantage that the design flexibility of the amount of erythritol added is high.

Pentaerythritol is characterized in that it sublimes gradually when heated, and is dehydrated and polymerized by heating at its melting point or more. Pentaerythritol has an advantage that due to this, the physical properties of an organic material change and the density and the strength are improved. Such reactivity is caused by its chemical structure and hardly occurs in the chemical structure of, for example, erythritol and sorbitol.

Erythritol or pentaerythritol has a larger effect by mixing it in an amount providing a concentration equal to or more than the concentration of the conductive polymer (P1) in the conductive polymer suspension. The upper limit of the amount of erythritol or pentaerythritol mixed is not particularly limited as long as it is an amount of erythritol or pentaerythritol dissolved in the conductive polymer suspension.

A resin that functions as binding action may be added to the obtained conductive polymer suspension. Specific examples of this resin include polyester resins, polyamide resins, polyimide resins, polyether resins, and polystyrene resins. The amount of this resin added is preferably 0.01 to 20 parts by weight, with respect to 100 parts by weight of the conductive polymer suspension, in terms of not impairing conductivity.

The conductive polymer suspension according to the present exemplary embodiment usually exhibits a dark blue color.

The average particle diameter of the particles contained in the conductive polymer suspension according to the present exemplary embodiment is preferably 5 nm or more and 100 nm or less because impregnation properties in the interior of porous anode conductor 1 are obtained. The average particle diameter of the particles can be calculated from a particle diameter distribution measured by a dynamic light scattering method.

A conductive polymer material can be obtained by removing the solvent from the conductive polymer suspension according to the present exemplary embodiment. This conductive polymer material has high conductivity. The conductive polymer (P1) has a high degree of crystallinity and disperses light, and therefore, this conductive polymer material has no transparency and exhibits a color close to a black color.

The removal of the solvent can be performed by drying the conductive polymer. The drying temperature is not particularly limited as long as it is equal to or less than the decomposition temperature of the conductive polymer. But, the drying temperature is preferably 300° C. or less.

The conductive polymer material obtained by removing the solvent from the conductive polymer suspension according to the present exemplary embodiment can be used as the solid electrolyte layer of a solid electrolytic capacitor. The conductive polymer (P1) contained in the conductive polymer suspension, and the conductive polymer material obtained by removing the solvent from the conductive polymer suspension have high conductivity, and therefore, a capacitor having low ESR can be obtained. Further, the degree of crystallinity of the conductive polymer (P1) is high, and therefore, the oxygen barrier properties are also correlatively high, and an improvement in the reliability of the capacitor is also sufficiently promising.

Figure 1:
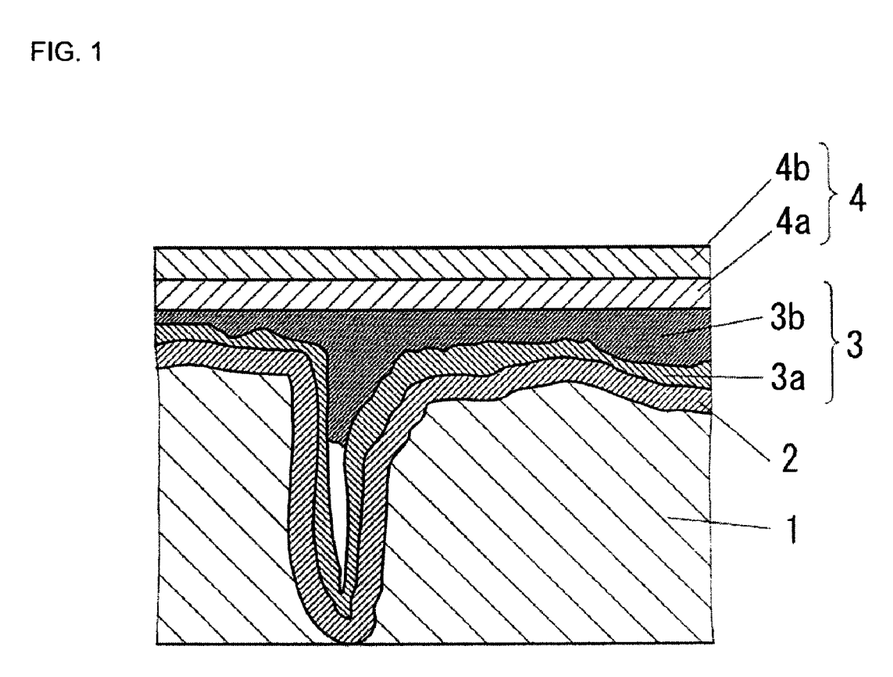
FIG. 1 is a schematic cross-sectional view showing the structure of a solid electrolytic capacitor according to the present exemplary embodiment.

A schematic cross-sectional view showing the structure of a solid electrolytic capacitor according to the present exemplary embodiment is shown in FIG. 1. This solid electrolytic capacitor has a structure in which dielectric layer 2, solid electrolyte layer 3, and cathode conductor 4 are formed in this order on anode conductor 1.

Anode conductor 1 is formed of a plate, foil, or wire of a valve action metal; a sintered body of fine particles of a valve action metal; a porous body metal subjected to surface enlargement treatment by etching; or the like. Specific examples of the valve action metal include tantalum, aluminum, titanium, niobium, zirconium, and alloys thereof. Among them, at least one valve action metal selected from aluminum, tantalum, and niobium is preferred.

Dielectric layer 2 is a layer that can be formed by the electrolytic oxidation of a surface of anode conductor 1 and is also formed in the void portions of the sintered body, the porous body, or the like. The thickness of dielectric layer 2 can be appropriately adjusted by the voltage of the electrolytic oxidation.

Solid electrolyte layer 3 contains at least the conductive polymer material obtained by removing the solvent from the above-described conductive polymer suspension. Examples of the method for forming solid electrolyte layer 3 include a method for coating or impregnating dielectric layer 2 with the above-described conductive polymer suspension and removing the solvent from the conductive polymer suspension.

The coating or impregnation method is not particularly limited, but it is preferred to leave dielectric layer 2 for several minutes to several tens of minutes after the coating or the impregnation in order to sufficiently fill the interior of the porous pores with the conductive polymer suspension. Repeated immersion, a reduced-pressure method, or a pressure method is preferred.

The removal of the solvent from the conductive polymer suspension can be performed by drying the conductive polymer. The drying temperature is not particularly limited as long as it is in a temperature range in which the solvent removal is possible. But, the upper limit temperature is preferably less than 300° C., in terms of preventing element degradation due to heat. The drying time needs to be appropriately optimized according to the drying temperature. But, the drying time is not particularly limited as long as it is in a range in which the conductivity is not impaired.

Further, solid electrolyte layer 3 may contain conductive polymers of pyrrole, thiophene, aniline, and derivatives thereof; oxide derivatives, such as manganese dioxide and ruthenium oxide; and organic semiconductors, such as TCNQ (7,7,8,8,-tetracyanoquinodimethane complex salt).

For example, solid electrolyte layer 3 can also be a two-layer structure of first solid electrolyte layer 3a and second solid electrolyte layer 3b. It is possible to subject a monomer (M2) providing a conductive polymer to chemical oxidative polymerization or electrolytic polymerization on dielectric layer 2 to form first solid electrolyte layer 3a containing a conductive polymer (P2), and coat or impregnate first solid electrolyte layer 3a with the above-described conductive polymer suspension and remove the solvent from the conductive polymer suspension to form second solid electrolyte layer 3b.

At least one selected from pyrrole, thiophene, aniline, and derivatives thereof can be used as the monomer (M2). Sulfonic acid compounds, such as alkylsulfonic acid, benzenesulfonic acid, naphthalenesulfonic acid, anthraquinonesulfonic acid, camphorsulfonic acid, and derivatives thereof, are preferred as the dopant used in subjecting the monomer (M2) to chemical oxidative polymerization or electrolytic polymerization to obtain the conductive polymer (P2). The molecular weight of the dopant can be appropriately selected from a low molecular compound to a high molecular weight compound and used. The solvent may be only water or a mixed solvent containing water and a water-soluble organic solvent.

The conductive polymer (P1) contained in first solid electrolyte layer 3a, and the conductive polymer (P2) contained in second solid electrolyte layer 3b are preferably polymers of the same type.

Cathode conductor 4 is not particularly limited as long as it is a conductor. But, cathode conductor 4 can be, for example, a two-layer structure of carbon layer 4a of graphite or the like, and silver conductive resin 4b.

EXAMPLES

The present exemplary embodiment will be more specifically described below, based on Examples, but the present exemplary embodiment is not limited only to these Examples.

Example 1

(Step (a))

3,4-ethylenedioxythiophene as the monomer (M1) was added to 100 ml of water at a concentration of 0.2 mol/L, and polyethylene glycol monostearate (n=40) as the nonionic surfactant (S1) was further added at a concentration of 25 mmol/L. Then, the mixture was stirred at room temperature for 1 hour to emulsify the monomer (M1) in the water. Here, the HLB value of polyethylene glycol monostearate (n=40) calculated by the Griffin method is 17.4. Then, toluenesulfonic acid as a dopant was added at a concentration of 0.4 mol/L, and ammonium persulfate as the oxidant (O1) was further added at a concentration of 0.5 mol/L. The obtained emulsion was stirred at room temperature for 24 hours to perform the chemical oxidative polymerization of 3,4-ethylenedioxythiophene to synthesize poly(3,4-ethylenedioxythiophene). At this time, the emulsion changed from yellow to dark blue.

(Step (b))

The emulsion after the polymerization was filtered using a reduced-pressure filtration apparatus, and the powder was recovered. The powder was washed using pure water to remove the nonionic surfactant (S1), the excess oxidant (O1), and the dopant. The washing with pure water was repeated until the acidity of the filtrate was pH 6 to 7. Then, the powder was washed using ethanol to remove the monomer (M1), the nonionic surfactant (S1), the oxidant (O1), and an oxidant after the reaction. The washing with ethanol was performed until the filtrate was colorless and transparent.

(Step (c))

0.5 g of the powder after the purification was dispersed in 50 ml of water, and then, 3.3 g of an aqueous solution containing 20% by weight of polystyrenesulfonic acid (weight average molecular weight: 14,000) as a polyacid component was added. 1.5 g of ammonium persulfate as the oxidant (O2) was added to this mixed liquid, and the mixture was stirred at room temperature for 24 hours. The obtained polythiophene suspension was dark blue.

The particle diameter distribution of the particles contained in the obtained polythiophene suspension was measured by a dynamic light scattering method, and the average particle diameter was calculated. The result is shown in Table 1.

Figure 2:
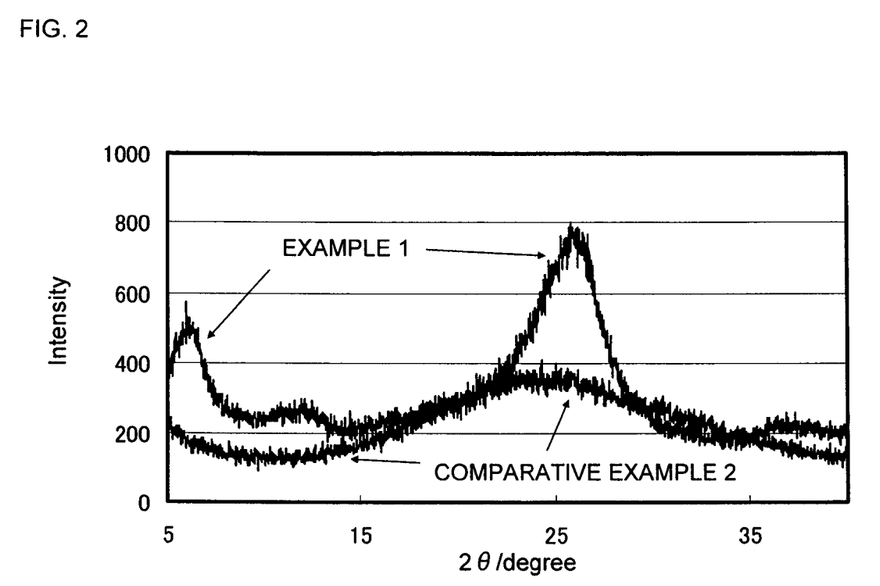
FIG. 2 is an X-ray diffraction chart of conductive polymer films formed in Example 1 and Comparative Example 2.

100 ml of the obtained polythiophene suspension was dropped on a glass substrate and dried in a thermostat at 125° C. to form a conductive polymer film. The surface resistance ($\Omega/\square$) and film thickness of the conductive polymer film were measured by a four-terminal method, and the conductivity (S/cm) of the conductive polymer film was calculated. The result is shown in Table 1. In addition, in order to evaluate the crystallinity of the formed conductive polymer film, the X-ray diffraction of the conductive polymer film was measured. The measurement was performed with a scan with a 2θ of 5 to 40°. The measurement result is shown in FIG. 2.

Example 2

A polythiophene suspension was produced as in Example 1, except that polyethylene glycol monocetyl ether (n=23) was used as the nonionic surfactant (S1), and the average particle diameter of the particles contained in the polythiophene suspension was calculated. Here, the HLB value of polyethylene glycol monocetyl ether (n=23) calculated by the Griffin method is 16.5. In addition, a conductive polymer film was formed as in Example 1, except that this polythiophene suspension was used, and the conductivity of the conductive polymer film was calculated. The result is shown in Table 1.

Example 3

A polythiophene suspension was produced as in Example 1, except that 3,4-ethylenedioxythiophene as the monomer (M1) was added at a concentration of 0.5 mol/L, and the average particle diameter of the particles contained in the polythiophene suspension was calculated. In addition, a conductive polymer film was formed as in Example 1, except that this polythiophene suspension was used, and the conductivity of the conductive polymer film was calculated. The result is shown in Table 1.

Example 4

A polythiophene suspension was produced as in Example 1, except that 3,4-ethylenedioxythiophene as the monomer (M1) was added at a concentration of 0.5 mol/L, and polyethylene glycol monostearate (n=40) as the nonionic surfactant (S1) was added at a concentration of 2 mmol/L. The average particle diameter of the particles contained in the polythiophene suspension was calculated. In addition, a conductive polymer film was formed as in Example 1, except that this polythiophene suspension was used, and the conductivity of the conductive polymer film was calculated. The result is shown in Table 1.

Example 5

A polythiophene suspension was produced as in Example 1, except that 2-naphthalenesulfonic acid was used as the dopant, and the average particle diameter of the particles contained in the polythiophene suspension was calculated. In addition, a conductive polymer film was formed as in Example 1, except that this polythiophene suspension was used, and the conductivity of the conductive polymer film was calculated. The result is shown in Table 1.

Example 6

A polythiophene suspension was produced as in Example 1, except that polystyrenesulfonic acid (weight average molecular weight: 50,000) was used as the polyacid component, and the average particle diameter of the particles contained in the polythiophene suspension was calculated. In addition, a conductive polymer film was formed as in Example 1, except that this polythiophene suspension was used, and the conductivity of the conductive polymer film was calculated. The result is shown in Table 1.

Example 7

1 g of erythritol was further dissolved in 10 g of the polythiophene suspension produced in Example 1 at room temperature. The average particle diameter of the particles contained in the obtained polythiophene suspension was calculated. In addition, a conductive polymer film was formed as in Example 1, except that the obtained polythiophene suspension was used, and the conductivity of the conductive polymer film was calculated. The result is shown in Table 1.

Comparative Example 1

2 g of polystyrenesulfonic acid (weight average molecular weight: 4,000), 0.5 g of 3,4-ethylenedioxythiophene, and 0.05 g of iron(III) sulfate were dissolved in 20 ml of water, and air was introduced over 24 hours to produce a polythiophene suspension. The average particle diameter of the particles contained in the obtained polythiophene suspension was calculated by a method similar to that of Example 1. In addition, a conductive polymer film was formed as in Example 1, except that the obtained polythiophene suspension was used, and the conductivity of the conductive polymer film was calculated. The result is shown in Table 1.

Comparative Example 2

A polythiophene suspension was produced as in Comparative Example 1, except that polystyrenesulfonic acid having a weight average molecular weight of 50,000 was used. The average particle diameter of the particles contained in the obtained polythiophene suspension was calculated. In addition, a conductive polymer film was formed as in Example 1, except that the obtained polythiophene suspension was used.

The conductivity of the conductive polymer film was calculated, and X-ray diffraction was measured. The results are shown in Table 1 and FIG. 2.

TABLE 1

|  | Average particle diameter (nm) | Conductivity (S/cm) |
|---|---|---|
| Example 1 | 50 | 145 |
| Example 2 | 90 | 140 |
| Example 3 | 80 | 130 |
| Example 4 | 100 | 150 |
| Example 5 | 55 | 165 |
| Example 6 | 90 | 140 |
| Example 7 | 50 | 170 |
| Comparative Example 1 | 1500 | 105 |
| Comparative Example 2 | 2000 | 110 |

Example 8

Using porous aluminum as an anode conductor of a valve action metal, an oxide film, which was a dielectric layer, was formed on a surface of the aluminum by anodic oxidation. Then, the anode conductor on which the dielectric layer was formed was immersed in the polythiophene suspension produced in Example 1, and pulled up, and then, the polythiophene suspension on the dielectric layer was dried and solidified at 125° C. to form a solid electrolyte layer. A graphite layer and a silver-containing resin layer were formed in order on the solid electrolyte layer to obtain a solid electrolytic capacitor.

The ESR (equivalent series resistance) of the obtained solid electrolytic capacitor was measured using an LCR meter at a frequency of 100 kHz. The value of the ESR for the total area of the cathode portion was normalized to that for a unit area (1 $cm^2$). In addition, the capacitance of the obtained solid electrolytic capacitor was measured using the LCR meter at a frequency of 120 Hz, and the proportion of the capacitance to theoretical capacitance (capacitance appearance ratio) was calculated. This capacitance appearance ratio can be regarded as the proportion of the solid electrolyte layer covering the oxide film, which is the dielectric layer, and is also referred to as coverage. The results are shown in Table 2.

Example 9

Using porous aluminum as an anode conductor of a valve action metal, an oxide film was formed on an aluminum metal surface by anodic oxidation. Then, the anode conductor on which a dielectric layer was formed was repeatedly immersed in and pulled up from a monomer liquid in which 10 g of pyrrole as the monomer (M2) was dissolved in 200 ml of pure water, and an oxidant liquid in which 20 g of p-toluenesulfonic acid as a dopant and 10 g of ammonium persulfate as an oxidant were dissolved in 200 ml of pure water, in order, 10 times, to perform chemical oxidative polymerization to form a first solid electrolyte layer.

The polythiophene suspension produced in Example 1 was dropped on the first solid electrolyte layer, and dried and solidified at 125° C. to form a second solid electrolyte layer. Then, a graphite layer and a silver-containing resin layer were formed in order on the second solid electrolyte layer to obtain a solid electrolytic capacitor.

The ESR (equivalent series resistance) and capacitance appearance ratio of the obtained solid electrolytic capacitor were measured by methods similar to those of Example 8. The results are shown in Table 2.

Example 10

A solid electrolytic capacitor was produced as in Example 9, except that the polythiophene suspension produced in Example 7 was used. Then, the ESR (equivalent series resistance) and capacitance appearance ratio of the obtained solid electrolytic capacitor were measured by methods similar to those of Example 8. The results are shown in Table 2.

Example 11

A solid electrolytic capacitor was produced as in Example 8, except that porous tantalum was used as the anode conductor of a valve action metal. Then, the ESR (equivalent series resistance) and capacitance appearance ratio of the obtained solid electrolytic capacitor were measured by methods similar to those of Example 8. The results are shown in Table 2.

Comparative Example 3

A solid electrolytic capacitor was produced as in Example 8, except that the polythiophene suspension produced in Comparative Example 2 was used. Then, the ESR (equivalent series resistance) and capacitance appearance ratio of the obtained solid electrolytic capacitor were measured by methods similar to those of Example 8. The results are shown in Table 2.

Comparative Example 4

A solid electrolytic capacitor was produced as in Example 9, except that the polythiophene suspension produced in Comparative Example 2 was used. Then, the ESR (equivalent series resistance) and capacitance appearance ratio of the obtained solid electrolytic capacitor were measured by methods similar to those of Example 8. The results are shown in Table 2.

TABLE 2

|  | ESR (m$\Omega \cdot cm^2$) | Coverage (%) |
|---|---|---|
| Example 8 | 2.1 | 80 |
| Example 9 | 1.7 | 97 |
| Example 10 | 1.5 | 82 |
| Example 11 | 2.2 | 84 |
| Comparative Example 3 | 250 | <1 |
| Comparative Example 4 | 3.2 | 87 |

As shown in Table 1, the particles contained in the polythiophene suspensions produced in Examples 1 to 7 all had a smaller particle diameter than the particles contained in the polythiophene suspensions produced in Comparative Examples 1 and 2. By undergoing the step (a) to the step (c) in this manner, the particles contained in the polythiophene suspension can be made minute.

This is considered to be because by making the concentration of the monomer (M1) and the nonionic surfactant (S1) in the emulsion used in the step (a) appropriate, aggregation in the polymerization process can be prevented, the primary particle diameter of the conductive polymer (P1) obtained in the step (b) is made minute, and the conductive polymer (P1) having the primary particle diameter is dispersed in the step (c).

In addition, as shown in Table 1, the conductive polymer films produced in Examples 1 to 7 all had higher conductivity than the conductive polymer films produced in Comparative Examples 1 and 2. By undergoing the step (a) to the step (c) in this manner, (1) the choice of the dopant is wide, (2) a dopant that increases the degree of crystallinity can be selected, and (3) the washing is easy, and higher purity can be intended. As a result, higher conductivity can be achieved.

In addition, the conductive polymer film produced in Example 7 in which the step (d) was performed after the step (c) had higher conductivity. This is considered to be because the erythritol interacted with the polystyrenesulfonic acid present near the poly(3,4-ethylenedioxythiophene) particles in the polythiophene suspension, and therefore, the resistance between the poly(3,4-ethylenedioxythiophene) particles was lowered, and the density of the poly(3,4-ethylenedioxythiophene) was increased.

From the X-ray diffraction measurement results shown in FIG. 2, it was also confirmed that the conductive polymer film formed in Example 1 had higher crystallinity than the conductive polymer film formed in Comparative Example 2. Therefore, the poly(3,4-ethylenedioxythiophene) in the obtained polythiophene solution had good electron conduction between the polymer chains and had high conductivity. The conductive polymer film formed in Example 1 had a high degree of crystallinity and dispersed light, and therefore had no transparency and exhibited a color close to a black color.

As shown in Table 2, the solid electrolytic capacitors fabricated in Examples 8 to 11 had lower resistance (ESR) than the solid electrolytic capacitors fabricated in Comparative Examples 3 and 4. This is considered to be because the poly(3,4-ethylenedioxythiophene) contained in the polythiophene suspensions used in Examples 8 to 11 had high conductivity, and therefore, it was possible to reduce the resistance of the solid electrolyte.

In addition, since the poly(3,4-ethylenedioxythiophene) particles contained in the polythiophene suspension have a small diameter, the impregnation properties for the porous anode conductor is excellent, and a sufficient capacitance appearance ratio can be achieved even by a method for producing a solid electrolytic capacitor in which no chemical oxidative polymerization is performed as in Example 9.

What is claimed is:

1. A method for producing a conductive polymer suspension, comprising:
   (a) a step of, in an emulsion comprising a dopant of a low molecular organic acid or a salt thereof, obtained by emulsifying a monomer (M1) providing a conductive polymer, using a nonionic surfactant (S1), in a water, subjecting the monomer (M1) to chemical oxidative polymerization, using an oxidant (O1) to synthesize a conductive polymer (P1);
   (b) a step of purifying the conductive polymer (P1); and
   (c) a step of mixing the purified conductive polymer (P1) and an oxidant (O2) in an aqueous solvent comprising a polyacid component to obtain a conductive polymer suspension.

2. The method for producing a conductive polymer suspension according to claim 1, wherein a concentration of the monomer (M1) in the emulsion is 0.5 mol/L or less, and a concentration of the nonionic surfactant (S1) in the emulsion is 2 mmol/L or more.

3. The method for producing a conductive polymer suspension according to claim 1, wherein the nonionic surfactant (S1) is at least one selected from polyethylene glycol, a polyethylene glycol alkyl ether, a polyethylene glycol fatty acid ester, and an acetylene glycol derivative.

4. The method for producing a conductive polymer suspension according to claim 1, wherein an HLB of the nonionic surfactant (S1) is 6 or more.

5. The method for producing a conductive polymer suspension according to claim 1, wherein the monomer (M1) is 3,4-ethylenedioxythiophene.

6. The method for producing a conductive polymer suspension according to claim 1, wherein the dopant is at least one selected from benzenesulfonic acid, naphthalenesulfonic acid, camphorsulfonic acid, and derivatives thereof, and salts thereof.

7. The method for producing a conductive polymer suspension according to claim 1, wherein in the step (b), the conductive polymer (P1) is washed using a solvent capable of dissolving at least one of the monomer (M1), the oxidant (O1), and the nonionic surfactant (S1).

8. The method for producing a conductive polymer suspension according to claim 1, wherein the polyacid component is polystyrenesulfonic acid.

9. The method for producing a conductive polymer suspension according to claim 8, wherein a weight average molecular weight of the polystyrenesulfonic acid is 2,000 to 500,000.

10. The method for producing a conductive polymer suspension according to claim 1, further comprising
    (d) a step of mixing at least one selected from erythritol and pentaerythritol.

11. A conductive polymer suspension obtained by a method according to claim 1.

12. The conductive polymer suspension according to claim 11, wherein an average particle diameter of particles contained in the conductive polymer suspension is 5 nm or more and 100 nm or less.

13. A conductive polymer material obtained by removing a solvent from a conductive polymer suspension according to claim 11.

14. A solid electrolytic capacitor comprising a solid electrolyte layer comprising a conductive polymer material according to claim 13.

15. The solid electrolytic capacitor according to claim 14, comprising an anode conductor of a valve action metal, and a dielectric layer formed on a surface of the anode conductor, wherein the solid electrolyte layer is formed on the dielectric layer.

16. The solid electrolytic capacitor according to claim 15, wherein the valve action metal is at least one selected from aluminum, tantalum, and niobium.

17. A method for producing a solid electrolytic capacitor, comprising the steps of:
    forming a dielectric layer on a surface of an anode conductor of a valve action metal; and
    coating or impregnating the dielectric layer with a conductive polymer suspension according to claim 11 and removing a solvent from the conductive polymer suspension to form a solid electrolyte layer comprising a conductive polymer material.

18. The method for producing a solid electrolytic capacitor according to claim 17, wherein the valve action metal is at least one selected from aluminum, tantalum, and niobium.

19. A method for producing a solid electrolytic capacitor, comprising the steps of:
    forming a dielectric layer on a surface of an anode conductor of a valve action metal;
    subjecting a monomer (M2) providing a conductive polymer to chemical oxidative polymerization or electrolytic polymerization on the dielectric layer to form a first solid electrolyte layer comprising a conductive polymer (P2); and coating or impregnating the first solid electrolyte layer with a conductive polymer suspension according to claim 11 and removing a solvent from the conductive polymer suspension to form a second solid electrolyte layer.

20. The method for producing a solid electrolytic capacitor according to claim 19, wherein the conductive polymer (P2) is a polymer obtained by subjecting at least one selected from pyrrole, thiophene, aniline, and derivatives thereof, as the monomer (M2), to chemical oxidative polymerization or electrolytic polymerization.

* * * * *